United States Patent [19]

Kariya

[11] 4,418,412

[45] Nov. 29, 1983

[54] DATA REGISTERING SYSTEM WITH KEYED IN AND VOICED DATA COMPARISON

[75] Inventor: Yutaka Kariya, Futsusa, Japan

[73] Assignee: Casio Computer Co., Ltd., Tokyo, Japan

[21] Appl. No.: 228,983

[22] Filed: Jan. 27, 1981

[30] Foreign Application Priority Data

Feb. 4, 1980 [JP] Japan .................................. 55-12195

[51] Int. Cl.³ .......................... G06F 3/16; G06F 15/02
[52] U.S. Cl. ..................................... 371/68; 364/709;
364/710; 381/51; 381/43
[58] Field of Search .................. 371/68; 364/709, 710,
364/405, 200, 900; 179/1 VC, 1 SD, 1 SE, 1
SM; 367/198

[56] References Cited

U.S. PATENT DOCUMENTS

| | | | |
|---|---|---|---|
| 2,599,392 | 6/1952 | Kille | 371/68 |
| 3,215,821 | 11/1965 | Stenby | 364/709 |
| 3,356,836 | 12/1967 | Stenby | 364/910 |
| 3,641,500 | 2/1972 | Greanias et al. | 179/1 VC |
| 3,742,451 | 6/1973 | Graham et al. | 367/198 |
| 4,016,540 | 4/1977 | Hyatt | 364/200 |
| 4,060,848 | 11/1977 | Hyatt | 364/200 |

FOREIGN PATENT DOCUMENTS

| | | | |
|---|---|---|---|
| 56-82931 | 7/1981 | Japan | 364/709 |
| 56-105528 | 8/1981 | Japan | 364/709 |
| 611226 | 6/1978 | U.S.S.R. | 367/198 |

OTHER PUBLICATIONS

Nachrichtentechnische Zeitschrift NTZ vol. 32 (1979), No. 9, pp. 603-607.
E. G. Nassimbene, Speech Input Technique for Data Entry to Word Processing Equipment, IBM Tech. Discl. Bulletin, vol. 22, No. 7, Dec. 1979, pp. 2891-2892.

*Primary Examiner*—Charles E. Atkinson
*Attorney, Agent, or Firm*—Frishauf, Holtz, Goodman & Woodward

[57] ABSTRACT

In a data registering system, keyed-in data coupled from a key input section and voiced sound input data coupled from a microphone are compared in a sound controller and, when both the keyed in and voiced data coincide, subsequent calculation processing with the input data is allowed.

8 Claims, 3 Drawing Figures

DATA REGISTERING SYSTEM WITH KEYED IN AND VOICED DATA COMPARISON

BACKGROUND OF THE INVENTION

This invention relates to a data registering system which is capable of automatically checking for errors in input data.

In the usual electronic calculator provided with a keyboard, data is keyed in by the operator. When coupling data by a keying operation, the operator of course has to exercise care for coupling data without any mistake. Usually, this kind of electronic calculator is also provided with a display section for displaying the data corresponding to the operated keys so that the operator can visually confirm the data keyed in. However, it is likely that the coupled data is registered without being checked when the operator is heedless. Therefore, there is a possibility of registering erroneous data. Erroneous registration of data such as amount data in the case of a cash register or commodity code data may not be settled up merely as such but is prone to discredit the shop. For this reason, it must be avoided by all means. Where a great deal of data are coupled from a keyboard, however, it is difficult to completely eliminate erroneous data registration.

The object of the invention is to provide a data registering system which can automatically check whether coupled data is right.

SUMMARY OF THE INVENTION

To achieve this objective, the data registering system according to the invention comprises means for converting sound input into digital sound input data, means connected to the converting means for memorizing the digital sound input data therefrom, a keyboard including a number of keys, a keyed-in data memory means connected to the keyboard for memorizing keyed-in data, and a central processing unit connected to the digital sound input data memorizing means and also to the keyed-in data memory means and functioning to compare the sound input data and keyed-in data, said central processing unit also functioning to accept the keyed-in data and allow calculation processing therewith if and only if the sound input data and keyed-in data coincide.

With this construction, registration of erroneously coupled data can be prevented to permit improvement of the correctness of data handled, which is desired particcularly in the operation of electronic cash registers for money amount supervision requiring strict correctness. Besides, since the operator can orally couple sound data concurrently with the keying operation, the keying operation control will not be sacrificed at all.

This invention can be more fully understood from the following detailed description when taken in conjunction with the accompanying drawings.

DETAILED DESCRIPTION

Figure 1:
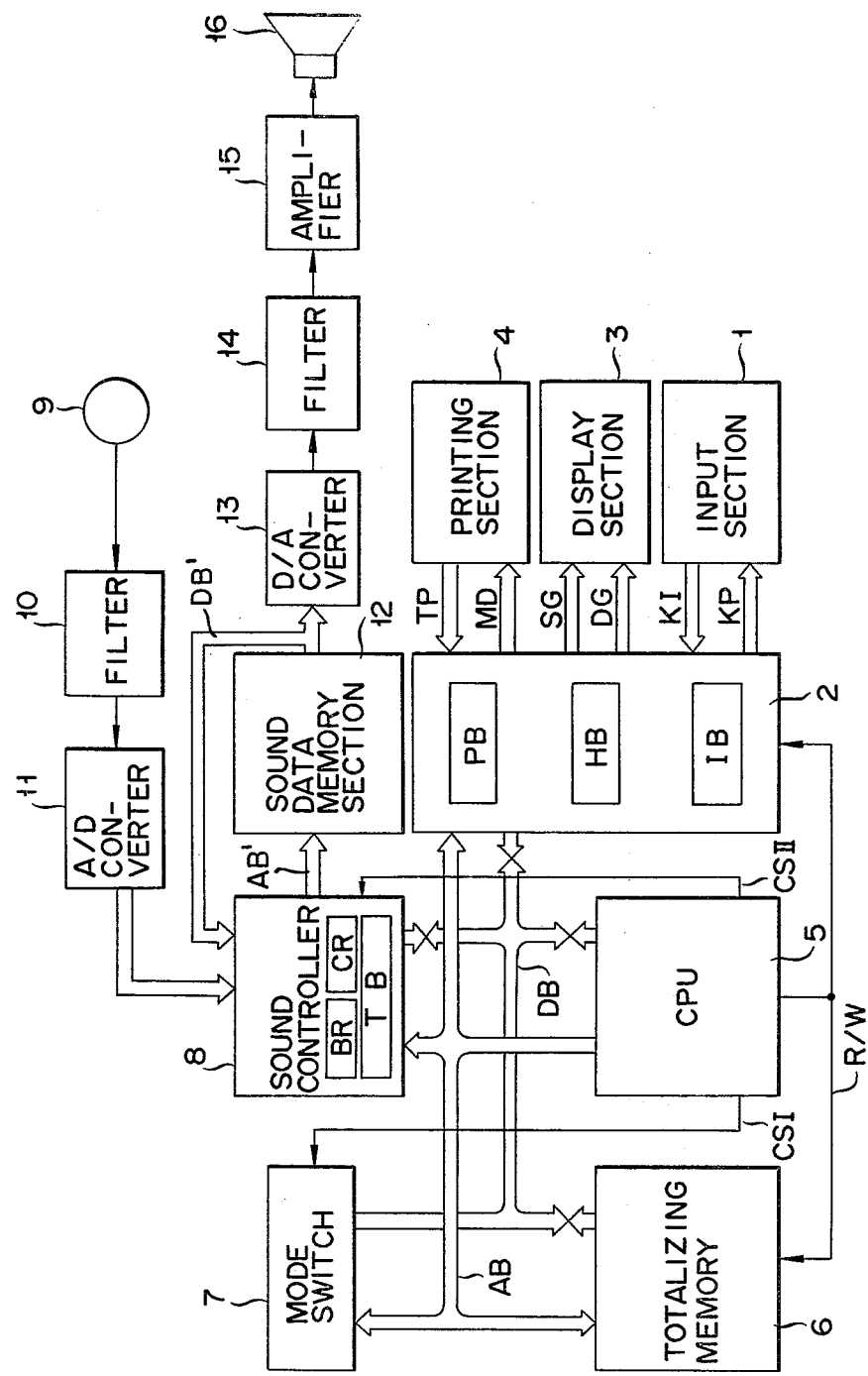
FIG. 1 is a schematic representation of an embodiment of the invention.

Now, an embodiment of the invention applied to an electronic cash register will be described with reference to FIGS. 1 through 3. FIG. 1 schematically shows the construction of the electronic cash register. In FIG. 1, designated at 1 is an input section, which is provided with amount data input keys and other keys such as department keys and transaction group keys. To the input section 1 a timing signal KP for sampling is supplied from an input/output (I/O) unit 2. When a keying operation is made in the input section 1, the timing signal KP is selected according to the operated key, and the selected timing signal is coupled as a keyed-in signal KI back to an input buffer IB provided in the I/O unit 2. The I/O unit 2 comprises, in addition to the input buffer IB, a display buffer HB and a printing buffer PB. The display buffer HB is connected to a display section 3, and the printing buffer PB is connected to a printing section 4.

In the display section 3, amount data and other data are displayed according to segment signals SG obtained through the decoding of digit signals from the I/O unit 2 and data from the display buffer HB. From the printing section 4, a printing position signal TP representing the printing position of printing drums (not shown) provided in this section is fed to the I/O unit 2, and from the I/O unit 2 a printing instruction signal MD which is produced when the printing position signal TP and the data in the printing buffer PB coincide is fed to the printing section 4, whereby the printing of amount data and other data on a journal sheet and also on a receipt sheet is effected.

Designated at 5 is a central processing unit (CPU), which is connected with a totalizing memory 6, a mode switch 7 and a sound controller 8 through a data bus line DB and an address bus line AB. The I/O unit 2 also supplies read/write (R/W) signals to the I/O unit 2 and totalizing memory 6, a chip specification signal $CS_I$ to the mode switch 7 and a chip specification signal $CS_{II}$ to the sound controller 8. The totalizing memory 6 includes an instruction data memory section in which code data for producing sound for a reregistration instruction is stored, and it also includes sales data memory sections for storing registered sales amount data for individual departments, transaction groups, etc. Transfer of data between this memory 6 and CPU 5 is effected according to the R/W signal mentioned above. The mode switch 7 serves to specify various operation modes such as a "registration" mode, a "return" mode and a "settlement" mode. When a given mode is specified by the chip specification signal $CS_I$, data representing the specified mode is written in the CPU 5.

Designated at 9 is a microphone. Sound orally coupled to the microphone 9 is converted to analog sound data which is coupled to a filter 10. The filter 10 selectively passes analog sound data in a predetermined frequency range to an analog-to-digital (A/D) converter 11. The A/D converter 11 converts the input analog sound data into digital sound data which is coupled to the sound controller 8. A sound controller 8 is connected to CPU through the above-mentioned address bus line DB and data bus line DB and to a sound data memory section 12 through an address bus line AB' and data bus line DB'. The sound controller 8 includes buffer registers BR, CR, sound buffer TB, a comparison circuit (not shown) for comparing the content of the buffer register BR with the content of the buffer register CR, an address designating circuit (not shown) for designating the address of the sound data memory section 12 and a control circuit (not shown) for controlling these parts. The sound data memory section 12 includes a read only memory (ROM), in which basic language sound data such as zero , one , two ... hundred and thousand , are stored at respective addresses in the ROM. The sound controller 8 causes the digital sound data from the A/D converter 11 to be stored in the buffer register BR and delivers an output signal from the address designating circuit (not shown) through the address bus line AB' to the sound data memory section 12 to permit the addresses of the sound data memory section 12 to be sequentially designated. The sound data memory section 12 causes the digital sound data which is stored at the designated address in the ROM thereof to be sequentially written into the buffer register CR in the sound controller 8 through the data bus DB'. The sound controller 8 causes the comparison circuit thereof (not shown) to sequentially compare the digital sound data which is sequentially written into the buffer register CR with the digital sound data which is stored in the buffer register BR. When the aforementioned digital sound in registers CR and BR data coincide, address data for the basic language sound corresponding to the coinciding digital sound data are written in the sound buffer TB in the sound controller 8. The sound controller 8 controls the address designating circuit thereof (not shown) according to the data transferred from the CPU 5, and sequentially designates the address of the sound data memory section 12 to deliver the designated digital sound data to the digital-to-analog (D/A) converter 13. The D/A converter 13 converts the input digital sound data into analog sound data which is coupled to a filter 14. The filter 14 selectively passes the input sound data in a predetermined frequency range to an amplifier 15. The amplifier 12 amplifies the input analog sound data to a predetermined voltage level, and its amplified output is coupled to a loudspeaker 16. The loudspeaker 16 produces sounds according to the input analog sound data.

Figure 2:
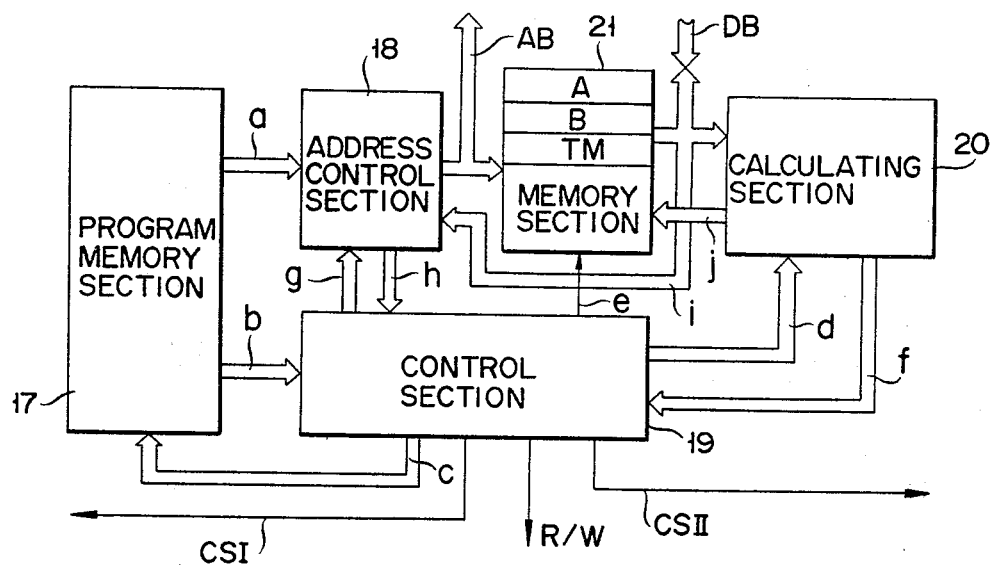
FIG. 2 is a schematic representation of a CPU in the same embodiment.

FIG. 2 schematically shows the internal construction of the CPU 5 in further detail. In FIG. 2, designated at 17 is a program memory section 10 including a ROM, in which various micro-instructions are stored. The program memory section 17 feeds address signals through a line a to an address control section 18, and also feeds operation code and address signal specifying the next address in the program memory section 17 to a control section 19. The next address signals are coupled through the control section 19 to program memory section 17, whereby successive micro-instructions are outputted.

The control section 19 decodes the input operation code to produce an instruction signal specifying an addition or subtraction operation, and this instruction signal is coupled to a calculating section 20. The control section 19 produces the aforementioned R/W signal and chip specification signals $CS_I$ and $CS_{II}$, and it also feeds a R/W signal through a line e to a memory section 21. This section 19 further effects alteration of addresses according to data coupled through a line f and also to whether or not there is a carry. It further feeds through a line g a signal specifying an up- or down-counting operation of an address counter within the address control section 18.

The address control section 18 specifies addresses of the aforementioned I/O unit 2, totalizing memory 6 and sound controller 8 as well as the memory section 21 through the address bus line AB and, when the address specification is ended, feeds an end signal through a line h to the control section 19. To the address control section 18 is fed through a line i data stored in the memory section 21, and address specification is effected according to the value of this data. The memory section 21 includes various registers such as a sound input register A, a register B and a universal register TM. It effects transfer of data with respect to the I/O unit 2, totalizing memory 6, sound controller 8 and calculating section 20 through the data bus line DB, and also the operation mode specified by the mode switch 7 is written in it. The calculating section 20 carries out various specified calculations, and the results of calculations are transferred through a line j to the memory section 21.

Now, the operation, i.e., input data checking operation, of the electronic cash register of the above construction will be described. It is now assumed that a sale amount of 2,400 yen is to be registered in the I/O unit 2 after setting the mode switch 7 to a "registration" mode. In this case, the operator operates amount input keys in the input section 1 to couple the amount data "2,400", while at the same time he pronounces "two thousand and four hundred yen" to the microphone 19. As a result, the input amount data thus coupled is transferred from the input section 1 through the input buffer IB to the register B in the memory section 21 and stored therein. Also, the sound data input to the microphone 9 is coupled through the filter 10 and A/D converter 11 to the sound controller 8, and according to this sound data, input address data are coupled from the sound data memory section 12 to the sound buffer TB and stored therein.

Figure 3:
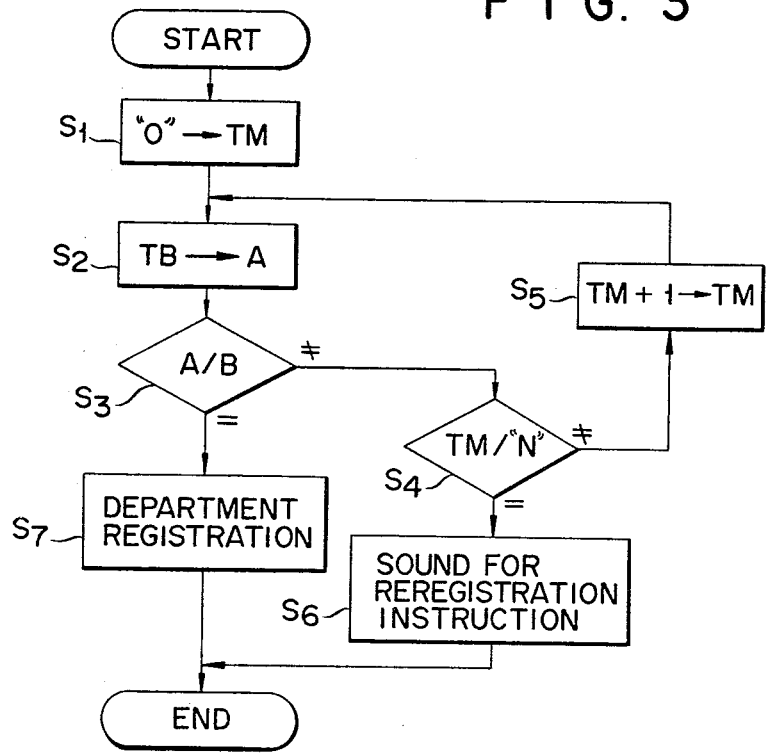
FIG. 3 is a flow chart for illustrating the operation of the same embodiment.

In this state, the operator then operates department keys to couple data "02", whereby a process as shown by the flow chart of FIG. 3 is executed. Referring to FIG. 3, in a step $S_1$ "0" is written in the universal register TM in the memory section 21. Then, in a step $S_2$ the chip specification signal $CS_{II}$ is produced from the CPU 5, and the data in the sound buffer register TB in the sound controller 8 is transferred to the sound input register A in the memory section 21 and stored therein. Subsequently, in a step $S_3$ the data in the sound input register A and the keyed-in data in the register B are compared in the calculating section 20. If the compared data do not coincide, a step $S_4$ is executed. In the step $S_4$, whether the content in the universal register TM is "N" is checked. If a negation answer yields in this step, a step $S_5$ is executed. In the step $S_5$, "1" is added to the content of the universal register TM, and the result is stored therein. After the step $S_5$, the step $S_2$ is repeatedly executed. It will be seen that inasmuch as the content stored in the sound input register A and the content stored in the register B do not coincide in the comparison in the step $S_3$, the steps $S_4$, $S_5$ and $S_2$ are repeatedly executed until the content of the universal register TM becomes "N", i.e., for a period sufficient to store all the sound coupled as data in the sound buffer TB.

If a wrong amount data is coupled by the keying operation, it is decided in the step $S_4$ that the content of the universal register TM is equal to "N", and a step $S_6$ is executed. In the step $S_6$, reregistration instruction data is produced from an instruction memory region of the totalizing memory 6 and given to the sound buffer TB. As a result, the process based upon the amount data keying operation as described above is inhibited, and sound data in the sound data memory section 12 is read out according to the aforementioned reregistration instruction data and coupled through the D/A converter 13, filter 14 and amplifier 15 to the loudspeaker 16. Thus, sound for a reregistration instruction, for instance saying "Reregister", is produced.

If the amount data is correctly keyed in, it is determined in the step $S_3$ that the content of the sound input register A coincides with that of the register B, and a step $S_7$ is executed. In the step $S_7$, department registration, in which the amount data in the register B is added up in a sales amount data memory section of the totalizing memory 6, is effected to bring an end to the input data checking operation. As has been shown, by keying in the amount data for registration while orally coupling it to the microphone, a reregistration instruction is produced if the keyed-in data is wrong, while the registration process is automatically effected if the right data is keyed in.

While the operation that is described above is caused to occur when the mode switch 7 is set to the "registration" mode, this is by no means limitative, and it is possible to arrange that the same operation is brought about in a different mode.

Also, while the operation described above is caused to take place by operating the department key, this is again by no means limitative, and it is possible to arrange that the same operation is brought about by operating a different key such as a transaction key.

Further, the voice sound coupled to the microphone 19 is not limited to that mentioned above; for instance it is possible to arrange such that voice sound "two, four, zero, zero" be pronounced when orally coupling in the amount data "2,400". In general, it is possible to permit voice sound of any form to be coupled insofar as the coupled sound data can be identified as such.

Furthermore, while in the above embodiment the comparison of keyed-in amount data and corresponding orally coupled amount data is made after the completion of keying of a set of amount data, this is by no means limitative; for instance, it is possible to arrange such that every time a bit of the amount data is coupled by operating the corresponding key it is compared with a concurrently coupled sound data for that bit.

Moreover, while the above embodiment is directed to an electronic cash register, this is by no means limitative, and the invention is also applicable to other electronic apparatus such as teller's machines and typewriters.

What is claimed is:

1. A data registering system with keyed in and voiced data comparison, comprising:
   a keyboard having a plurality of keys for inputting keyed in data;
   a microphone for inputting voiced language sounds from an operator;
   sound input conversion means coupled to said microphone for converting the inputted voice sounds to sound input data;
   a sound input data memory coupled to said sound input conversion means for storing the converted sound input data therein;
   alarm informing means; and
   control means coupled to said keyboard, to said sound input data memory and to said alarm informing means, and including judging means for judging whether or not the contents of keyed in data inputted by the operation of at least one key on said keyboard coincides with the contents of the sound input data which is stored in said sound input data memory, said control means being responsive to said judging means for executing a process based on the coincidence input signal when the contents of said keyed in data and said sound input data are determined by said judging means to coincide with each other and for inhibiting the execution of said process and driving said alarm informing means when the contents of said keyed in data and said sound input data are determined by said judging means not to coincide with each other.

2. The data registering system of claim 1, wherein:
   said keyboard has numeral keys and function keys; and
   said control means includes an entry memory for storing keyed in numeral data which is inputted by the operation of keys on said keyboard, said judging means being responsive to operation of a function key of said keyboard for judging whether or not the contents of said sound input data memory coincide with the contents of said entry memory when a function key for designating a calculation processing is operated by an operator.

3. The data registering system of claim 1, wherein said judging means is responsive to key operation of said keyboard for judging whether or not the contents of said sound input data memory coincides with the contents of the keyed in data which is inputted each time a key on said keyboard is operated.

4. The data registering system of claim 1, wherein said alarm informing means comprises an alarm device for producing an audible sound.

5. The data registering system of claim 2, wherein said alarm device comprises a sound data memory for storing sound data corresponding to voice data of different voices; sound output conversion means coupled to said sound data memory for converting the sound data from said data memory to corresponding voice output data; and a speaker coupled to said sound output conversion means for producing an audible sound corresponding to said voice output data.

6. The data registering system of claim 5, wherein said control means is responsive to said judging means for driving said speaker to generate, when a noncoincidence is detected by said judging means, a sound corresponding to the voice data representing a detected noncoincidence.

7. The data registering system of claim 1, wherein said control means comprises a central processing unit for executing a process based on said coincidence input signal when the contents of said keyed in data and said sound input data are determined by said judging means to coincide with each other.

8. The data registering system of claim 1, wherein said sound input data memory comprises a first register coupled to said sound input conversion means for storing the sound input data provided by said sound input conversion means; a sound data memory section for storing a plurality of sound data items corresponding to different predetermined sounds therein; and said data items from said sound data memory section being selectively read out therefrom responsive to the contents of said first register, said data items read out from said sound data memory section corresponding to voice input sounds from said operator.

* * * * *